Dec. 25, 1956
A. THOMAS
2,775,149
ADJUSTABLE BIT BORING BAR
Filed April 30, 1954
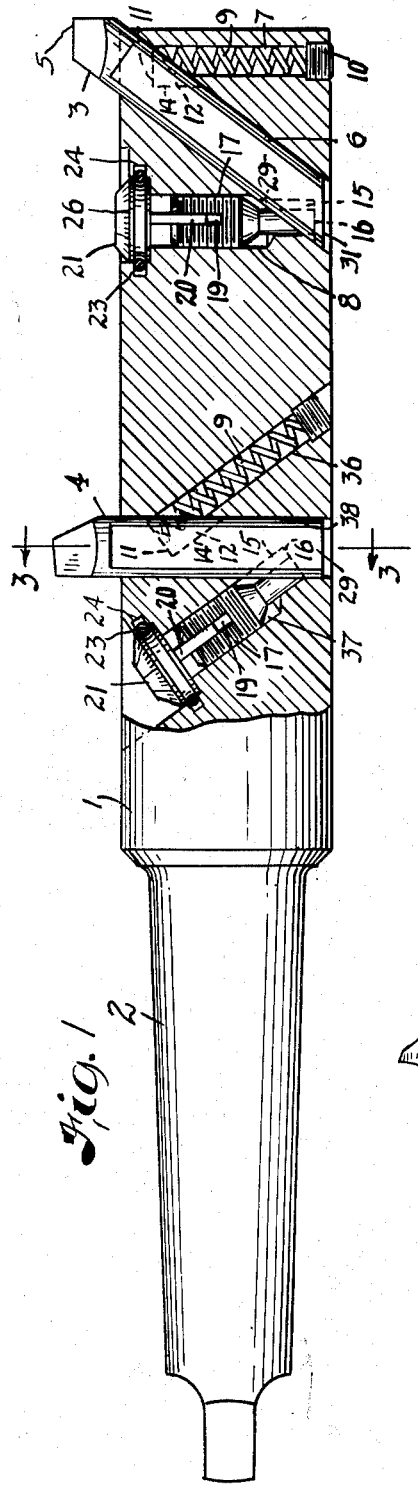
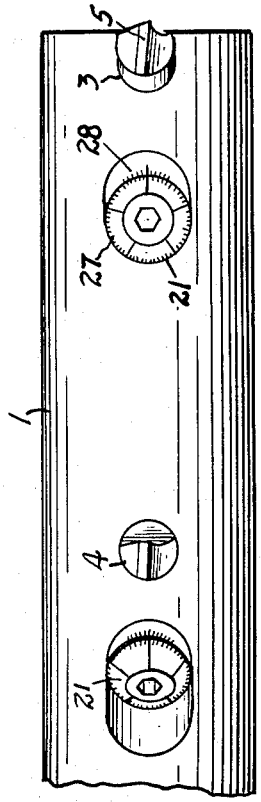
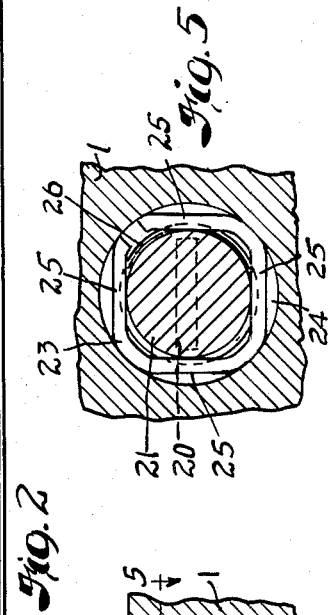
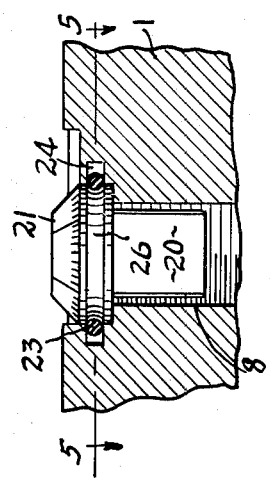
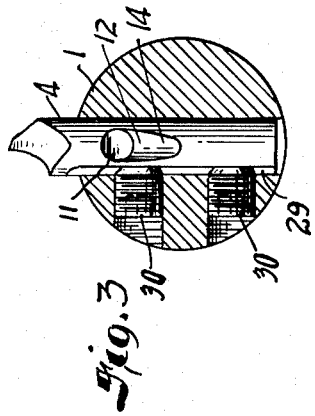
INVENTOR.
ALBERT THOMAS
BY
Oberlin + Limbach
ATTORNEYS.

United States Patent Office 2,775,149
Patented Dec. 25, 1956

2,775,149

ADJUSTABLE BIT BORING BAR

Albert Thomas, Homestead Park, Pa.

Application April 30, 1954, Serial No. 426,682

3 Claims. (Cl. 77—58)

The present invention relates generally as indicated to an adjustable bit boring bar, and more particularly to a boring bar which radially adjustably mounts a bit or cutter therein, such cutter sometimes being referred to in the art as a "fly" cutter.

In general, there are three types of boring bars, namely (1) the non-adjustable type wherein the bit is not adjustable and is firmly secured in place as by means of a lock screw bearing against the side thereof; (2) the adjustable type wherein an adjusting screw threaded into the boring bar bears against the end of the bit to enable adjustment of the latter, a lock screw likewise being employed to lock the bit in its adjusted position; and (3) another adjustable type wherein a micrometer adjustment is provided and also a means for locking the bit in its accurately adjusted position. In the last-mentioned type of boring bar, the micrometer adjustment may, of course, comprise a differential screw mechanism or a gear engaged with a gear rack formed along the side of the bit; and, in some instances, the bit itself is provided with threads engaged in a nut to provide differential accurate adjustment.

As will be apparent to those skilled in the art, the first-mentioned type of boring bar has the disadvantage of not being adjustable, and thus cannot be employed in the accurate boring of holes in workpieces. A serious disadvantage of the second and third types of boring bars mentioned above is that the adjusting mechanisms are rather complicated and costly, and in the third type, it is virtually impossible for the user to make his own replacement bits, and thus he is obligated to purchase the same, at high cost, from the bar manufacturer and to keep extra ones in stock.

With the foregoing in mind, it is a principal object of this invention to provide an adjustable bit boring bar in which the adjustment of the bit with respect to the axis of the bar is extremely accurate.

Another object of this invention is to provide an adjustable bit boring bar in which the bit is solidly locked relative to the boring bar so as to enable precision boring without loss of accurate adjustment, even when taking heavy cuts.

Another object of this invention is to provide an adjustable bit boring bar in which the adjustment of the bit may be effected, not only rapidly, but accurately as well.

Another object of this invention is to provide an adjustable bit boring bar in which the bar and bit are of a novel, simplified design for economical manufacture and for ready replacement of the bits thereof by the users themselves, the present bits being made from standard bit stock.

Another object of this invention is to provide an adjustable bit boring bar in which the bit locking pressures are not imposed on the adjusting means, and even in instances where the locking means is left untightened, axial thrust loads on the bit are not transmitted to the adjusting means as is the case in known constructions.

Another object of this invention is to provide an adjustable bit boring bar in which the adjusting mechanism is operative to move the bit both inward and outward whereby, after proper adjustment has been made, the bit can be locked in the adjusted position without having to hold the same against the adjusting member which bears on the bit.

Another object of this invention is to provide an adjustable bit boring bar in which a calibrated adjusting dial is rotatably, but axially fixedly mounted in the boring bar, and has a non-rotatable, axially slidable connection with the adjusting screw proper, such adjusting dial cooperating with indicia on the bar.

Another object of this invention is to provide an adjustable bit boring bar in which the aforesaid adjusting dial and adjusting screw are mounted for ready removal from the bar, but yet the adjusting dial is held against axial movement at all other times.

Another object of this invention is to provide an adjustable bit boring bar in which the adjusting mechanism itself effects a non-rotatable keying of the bit in the bar, whereby the bit-receiving bore in the bar may be of circular cross-section, and similarly the bits may be of circular cross-section, and therefore it is not necessary to incur the added expense of forming a square cross-section bit-receiving bore or of forming a keyway or the like in such bore.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawing:

Fig. 1 is a central longitudinal cross-section view of one embodiment of the present invention;

Fig. 2 is a top plan view of the right-hand end portion of the boring bar of Fig. 1;

Fig. 3 is a cross-section view lengthwise of the bit as taken, for example, along the line 3—3, Fig. 1;

Fig. 4 is an enlarged cross-section viewing showing the spring-retainer ring for the adjusting dial; and Fig. 5 is a cross-section view, taken along line 5—5, Fig. 4.

Referring now more particularly to the drawing, there is shown in Fig. 1 a typical boring bar 1 which has a shank 2 at one end thereof adapted for mounting in a machine tool spindle; and, although in most instances the boring bar 1 will be rotated by the spindle, it is to be understood that said bar may be fixed and the workpiece rotated with respect thereto. Similarly, the axial feed may entail either an axial movement of either or both the boring bar or the workpiece, as desired. The boring bar 1 herein may be referred to as a "stub bar" which is usually supported only at the spindle end and is often used to bore holes in workpieces that may be positioned comparatively close to the head-stock of the machine tool. Furthermore, blind holes in workpieces do not permit the extension of a "line bar" through the work on an end support; and, therefore, a stub bars are generally employed in such instances.

It is to be understood further that boring bars 1 of the type herein disclosed may be used other than for merely boring holes, but may be used in forming grooves and otherwise performing machining operations on workpieces. Likewise it is to be understood that the boring bar 1 may have mounted thereon a boring head in which the bits are adjustably mounted according to the present invention.

In the illustrative example of the boring bar 1 herein, the same carries two bits 3 and 4, the one at the end of the bar being for rough boring, and the adjacent one being for finish boring. Of course, the bit 3 at the end of the bar will have to be disposed obliquely so that the cutting edge 5 projects beyond the end of the bar 1, and in this way it is possible to form sharp corners, radii, or other formations at the bottom of blind holes.

Referring first to the end portion of the bar 1, the same is formed with a circular cross-section bore 6 passing through the axis of the bar 1 and angularly or obliquely disposed as shown.

Intersecting such bore 6 are parallel bores 7 and 8 disposed perpendicular to the axis of the bar, and in the bore 7 is fitted a coil spring 9 held therein by the screw 10. Said spring 9 is compressed between said screw 10 and the bottom wall 11 of a pocket 12 formed in the side of the bit 3, said wall 11 being perpendicular to the axis of the spring 9. The pocket 12 may be formed as with an ordinary end mill to provide a side wall 14 which is parallel to the axis of the spring 9. The width of the pocket will preferably be equal to the outside diameter of the spring 9 so that the bit 3 is, in effect, held against rotation in bore 6 by said spring. The expanding influence of the spring 9 will tend to move the cutter or bit 3 outward with respect to the boring bar 1.

The bit 3 is formed, adjacent its other end, with a similar pocket 15 including a bottom wall 16 which is perpendicular to the axis of the adjusting screw 17 which is threaded into the other bore 8 and including a side wall 18 parallel to the axis of said adjusting screw. Here again, the width of the pocket 15 is preferably approximately the same as the diameter of the lower end portion of the adjusting screw 17, whereby the spring 9 and adjusting screw 17 will serve to key the bit 3 for longitudinal, non-rotative movement in the bore 6.

The adjusting screw 17 aforesaid is formed with a slot 19 diametrically thereacross in which the tongue 20 of a rotary adjusting dial 21 is axially slidable, said adjusting dial 21 being held against axial movement as by means of a spring-retainer ring 23 which is fitted into a groove 24 in the boring bar 1 and which has portions 25 thereof engaged in the groove 26 around said dial 21. The upper face of said adjusting dial is formed with a series of uniformly spaced radial lines 27 which cooperate with lines 28 on the surface of a pocket of the boring bar 1, and obviously these last-mentioned lines 28 may constitute a vernier so that each division 27 on the dial 21 may indicate, for example, a .001" change in diameter of the hole bored by bit 3, and the vernier subdivisions will enable accurate adjustment to the nearest tenth of a thousandth.

As is apparent, when the adjusting dial 21 is turned either clockwise or counterclockwise, the bit 3 will be moved either inward or outward, the bit 3 being moved inwardly by direct engagement of the end of the adjusting screw 17 with the bottom wall 16 of pocket 15; and, when the adjusting screw 17 is turned in the opposite direction, the spring 9 will urge the bit 3 outwardly so as to maintain abutting engagement between the bottom wall 16 of the pocket 15 and the end of the adjusting screw 17.

The particular form of spring retainer 23 makes it possible to readily remove the adjusting dial 21 and adjusting screw 17 from the boring bar 1 simply by turning the adjusting dial 21 until a portion of the adjusting screw 17 abuts a portion of the adjusting dial 21, whereupon continued rotation of the dial will cause the same to be forced out of the bore 8 by expansion of the retainer ring 23 into groove 24, it being noted that the depth of the groove 26 is such that less than one-half of the cross-section diameter of the retainer ring 23 is in such groove. In this way, an axial force will be resolved into a radial expansion force. Similarly, to re-assemble the adjusting dial 21, it need merely be pushed down with its tongue 20 engaged in the slot 19 of the adjusting screw 17.

The side of the bit 3 may be formed with a flat 29, as shown, for firm engagement by a pair of lock screws 30 disposed transversely thereof and threaded into the boring bar 1.

The non-cutting end of the bit 3 is preferably cut on a bias, as shown at 31, so that in the innermost position it does not project beyond the periphery of the bar 1.

The extent of withdrawal of the adjusting screw 17 may be sufficient so that a bit 3 may be shoved into position from the spring end of bore 6, such shoving first compressing the spring 9; and, of course, when the upper pocket 12 is aligned with the spring 9, the latter will pop into engagement with the pocket wall 11; and then the adjusting dial 21 may be turned until the end of adjusting screw 17 engages the bottom wall 16 of the other pocket 15. Having roughly adjusted the bit 3 so that its cutting edge 5 is at approximately the desired distance from the axis of the bar 1, it is then necessary only to turn the adjusting dial in one direction or the other a predetermined amount as determined by the calibrations 27 and 28 and then turn in the lock screws 30 to securely hold the bit 3 in its accurately adjusted position.

The other bit 4 and adjusting mechanism is substantially identical to that just described except for the disposition of the bit-receiving, spring-receiving, and adjusting-screw-receiving bores, the latter two bores 36 and 37 yet being parallel to each other but angularly or obliquely disposed with respect to the axis of the boring bar 1 while the bit-receiving bore 38 is perpendicular to the axis of the bar and extends diametrically thereacross. Otherwise the same features and advantages are realized whether the bit-receiving bores are oblique or perpendicular, as shown. Accordingly, the same reference numerals have been used to denote the same or similar parts.

It is to be noted that the adjusting screw 17 and spring 9 ends serve to non-rotatably support the bits 3 and 5 in the bar 1 while yet the bit and bore cross-sections are circular. However, square cross-section bits may be employed if desired, and in such case the bores in the boring bar would likewise be of square cross-section. The flat 29 on the bits 3 and 4 may be dispensed with, but it is desired in that it provides a better bearing surface for secure locking in the boring bar 1 by means of the lock screws 30. In order to provide a secure three-point support, the opposite side of the bits 3 and 5 may be flattened to provide line contact at spaced points with the bit-receiving bore, a third point being the line passing through the axis of the lock screws 30. In this way, there can be no wobbling or misalignment of the bits 3 and 5 with respect to the axis of the receiving bores therefor even if the bits 3 and 5 are not very closely fitted into their respective receiving bores. Theoretically, when a circular cross-section bit is laterally clamped in a circular cross-section bore, there is only a two-point support, that is, pressure applied diametrically by the lock screws and the single line contact on the opposite side of the bit, and thus the bit might move laterally, especially when there is a clearance between the bit and its receiving bore. However, by flattening such opposite side, as mentioned above, the single point support on one side is changed to two points to eliminate the possibility of such lateral play of the bit.

Other modes of applying the principle of the invention may be employed, change being made as regards the details described, provided the features stated in any of the following claims, or the equivalent of such, be employed.

I therefore particularly point out and distinctly claim as my invention:

1. An adjustable bit boring bar formed with an opening in which a bit is adapted to be fitted for lengthwise adjustment therein, said bar being further formed with a threaded bore angularly intersecting such opening, an adjusting screw threaded into such bore and having an end portion adapted to extend into such opening to bear against a bit adapted to be positioned in such opening to thus move the bit longitudinally in such opening, and screw rotating means coaxial with said threaded bore and mounted in said bar for rotation with respect to said threaded bore but held against axial movement, said screw rotating means and said adjusting screw having complementary interfitting portions providing a non-rotary, axial slidable connection between them whereby, upon rotation of said screw rotating means in opposite directions, said adjusting screw is moved axially in opposite directions in said threaded bore, said bar being formed with another bore angularly related to and intersecting such opening, and a spring fitted into said last-named bore for yieldably engaging such bit to maintain engagement between said adjusting screw and the bit irrespective of the direction of rotation of said adjusting screw.

2. The adjustable bit boring bar of claim 1 wherein said threaded bore and said spring-receiving bore are parallel to each other and arranged so that said adjusting screw and said spring are disposed on opposite sides of such opening and thus adapted to engage opposite sides of such bit.

3. An adjustable bit boring bar formed with an opening in which a bit is adapted to be fitted for lengthwise adjustment therein, said bar being further formed with a threaded bore angularly intersecting such opening, an adjusting screw threaded into such bore and having an end portion adapted to extend into such opening to bear against such bit to thus move the bit longitudinally in such opening, and screw rotating means coaxial with said threaded bore and mounted in said bar for rotation with respect to said threaded bore, but held against axial movement, said screw rotating means and said adjusting screw having complementary interfitting portions providing a non-rotary, axially slidable connection between them whereby, upon rotation of said screw rotating means in opposite directions, said adjusting screw is moved axially in opposite directions in said threaded bore, said screw rotating means and said bar being formed with complementary grooves, and a retainer ring fitted into such grooves and providing such rotary, but axially fixed, mounting of said screw rotating means in said bar, said retainer ring being fabricated from circular cross-section wire bent to approximately polygonal form, and having its straight sides disposed less than half-way in the groove of said screw rotating means whereby axial pressures exerted on the latter by said adjusting screw effects outward deforming of such straight sides.

References Cited in the file of this patent
UNITED STATES PATENTS

| | | |
|---|---|---|
| 2,125,005 | Jearum | July 26, 1938 |
| 2,274,244 | Miller | Feb. 24, 1942 |

FOREIGN PATENTS

| | | |
|---|---|---|
| 815,288 | Germany | Oct. 1. 1951 |